US006733010B2

(12) United States Patent
Horii et al.

(10) Patent No.: US 6,733,010 B2
(45) Date of Patent: May 11, 2004

(54) SHEET FEEDING APPARATUS

(75) Inventors: Yoshiyuki Horii, Kyoto (JP); Eiji Katayama, Shiga (JP); Yoshihiro Oe, Muko (JP)

(73) Assignee: Horizon International Inc., Shiga (JP)

( * ) Notice: Subject to any disclaimer, the term of this patent is extended or adjusted under 35 U.S.C. 154(b) by 0 days.

(21) Appl. No.: 10/128,343

(22) Filed: Apr. 24, 2002

(65) Prior Publication Data

US 2002/0113358 A1 Aug. 22, 2002

Related U.S. Application Data

(62) Division of application No. 09/640,668, filed on Aug. 18, 2000.

(30) Foreign Application Priority Data

Aug. 23, 1999 (JP) .......................................... 11-234929

(51) Int. Cl.[7] ................................................ B65G 39/10
(52) U.S. Cl. ........................ 271/298; 271/302; 271/303
(58) Field of Search ........................... 270/52.02, 52.04, 270/59, 58.31, 58.32; 399/382; 271/303, 298, 302

(56) References Cited

U.S. PATENT DOCUMENTS 3,294,396 A * 12/1966 Staines ........................ 271/98
4,452,440 A * 6/1984 Fagan et al. ................. 271/4.1
4,513,957 A * 4/1985 Schaefer, Jr. ................ 271/90
4,589,647 A * 5/1986 Roller ......................... 271/94
5,272,511 A * 12/1993 Conrad et al. .............. 399/382
6,497,404 B1 * 12/2002 Horii et al. ................ 271/9.13

* cited by examiner

*Primary Examiner*—Richard Ridley
(74) *Attorney, Agent, or Firm*—Westerman, Hattori, Daniels & Adrian, LLP

(57) ABSTRACT

A sheet feeding apparatus comprises a sheet conveying mechanism for conveying sheets along a first conveying path (22) and stacking up them in a sheet stack-feed station (S), a tray (24) for storing a stack of cover sheets (P), a second conveying path (28) communicating with the first conveying path (22), a blow outlet (38) for blowing a jet of air towards the tray (24) to lift up each cover sheet (P), a sucker (30) for sucking the cover sheet (P), a sheet feeding mechanism for conveying the cover sheet (P) received from the sucker (30) along the second conveying path (28) and feeding it to the first conveying path (22), and a pneumatic pump (34) for providing a blow of air and a suction of air. The sheet feeding mechanism is changed to its standby mode when the cover sheet is transferred from the sucker (30) to the sheet feeding mechanism. Upon the sheets having been stacked in the sheet stack-feed station (S), the sheet feeding mechanism transfers the cover sheet. During the standby mode, the pneumatic pump (34) remains inactivated.

8 Claims, 7 Drawing Sheets

SHEET FEEDING APPARATUS

This application is a division of Ser. No. 09/640,668, filed Aug. 18, 2000.

FIELD OF THE INVENTION

The present invention relates to a sheet feeding apparatus and particularly to a sheet feeding apparatus adapted for feeding and placing a front cover received from a transfer path over a specific number of sheets (for example, bound as a booklet) or stacks of sheets supplied from a printing machine or a sorter.

BACKGROUND OF THE INVENTION

FIG. 13 is a side view showing a schematic arrangement of a conventional sheet feeder for a bookbinding machine. In FIG. 13, a side panel of the sheet feeding apparatus is removed for ease of the description.

As shown in FIG. 13, the sheet feeding apparatus 1 comprises a sheet reception inlet 2*a* for receiving sheets of paper, a tray 4 for storage of a stack of front covers P, a sheet stack-feed station S for stacking up the sheets and placing a front cover P on a stack of the sheets, a first conveying path 2 extending from the sheet reception inlet 2*a* to the sheet stack-feed station S, and a sheet conveying mechanism for conveying in a sequence the sheets received at the sheet reception inlet 2*a* to the sheet stack-feed station S along the first conveying path 2. The sheet conveying mechanism consists mainly of a conveyor belt 2*b*, transfer rollers 2*c* to 2*g*, and a discharge roller 2*h*.

The sheet feeding apparatus 1 also includes a second conveying path 8 extending from the tray 4 to the first conveying path 2 for joining with the first conveying path 2 and a sheet feeding mechanism for conveying the front cover P along the second conveying path 8 up to the first conveying path 2. The sheet feeding mechanism comprises a feed roller 5, a transfer roller 6, a drive motor 7, and a pair of feed rollers 8*a* and 8*b*.

The sheet feeding apparatus 1 further includes a sheet transfer mechanism for transferring the front cover P from the tray 4 to the sheet feeding mechanism. The sheet transfer mechanism comprises a pneumatic pump 14 and a drive motor 13 for driving the pneumatic pump 14. A first pulley 13*a* is mounted on the output shaft of the drive motor 13 while a second pulley 14*a* is mounted on the rotary shaft of the pneumatic pump 14. A belt 13*b* is mounted between the first pulley 13*a* and the second pulley 14*a* for transmitting the power of the drive motor 13 to the pneumatic pump 14.

The sheet transfer mechanism also includes a blow outlet 18 provided in the tray 4 for communicating via a first conduit 17 to the air outlet of the pneumatic pump 14 to blow up the front cover P in the tray 4, a sucker 10 communicated via a second conduit 11 to the air inlet of the pneumatic pump 14 and arranged for movement between the first position for sucking the front cover P blown up and the second position for transferring the front cover P to the sheet feeding mechanism, a sucker driving mechanism 10*a* for moving the sucker 10 between the first position and the second position, and a couple of first and second air valves, 12 and 16, for controlling the air intake and the air discharge of the pneumatic pump 14, respectively.

As the pneumatic pump 14 is actuated, a flow of air runs along the first conduit 17 in a direction denoted by the arrow Bb and exits at the blow outlet 18. This action effects an upper region of the stack of the front covers P in the tray 4 and more specifically, lifts up the uppermost front cover P. Simultaneously, a flow of air runs along the second conduit 11 in a direction denoted by the arrow Ba. This action causes the sucker 10 to suck up at its first position the uppermost front cover P lifted up. The sucker 10 is then moved to its second position for transferring the uppermost front cover P to the sheet feeder mechanism. The front cover P received by the sheet feeder mechanism is passed through the feed roller 5 and the transfer roller 6 and between the two feed rollers 8*a* and 8*b* as conveyed along the second conveying path 8 to the first conveying path 2.

The transfer of the front cover P to the sheet feeding mechanism by the sucker 10 is continuously carried out as synchronized with the conveying of the sheets along the first conveying path 2. Particularly in case that the sheet feeding apparatus is linked with an advanced digital printing machine, a given number of sheets for one book volume may be received in the order of page at the sheet reception inlet 2*a* of the first conveying path 2, conveyed along the first conveying path 2, and stacked up in the sheet stack-feed station S. During the conveying of the sheets, the pneumatic pump 14 remains actuated for releasing a blow of air from the blow outlet 18 to lift up the uppermost one of front covers. Before the transfer of the succeeding front cover is initiated, the first air valve 12 remains closed to allow the sucker 10 to suck up no front cover.

In the conventional sheet feeding apparatus, the transfer of a front cover from the second conveying path 8 to the first conveying path 2, and thus to the sheet feeding mechanism, is continuously carried out as synchronized with the timing of conveying the sheets along the first conveying path 2. If a feeding error of the front cover (no transfer of a front cover from the second conveying path 8 or transfer of multiple front covers at one time) occurs in a lot, the reaction is that the movement of the first conveying path 2 is halted and the error is eliminated by adding a front cover to, or removing the excessive front covers from, the lot. This will thus decline the operational efficiency of the apparatus.

Also, as the pneumatic pump 14 is continuously driven to blow a jet of air against the upper ones of the stacked front covers P in the tray 4, its temperature may increase and also the temperature of the jet of air. Accordingly, the front covers P are exposed to the hot air and may deform or curl up at their edges, hence lowering the quality and making their handling difficult at the succeeding step.

The pneumatic pump 14 remains actuated while no transfer of the front covers P is performed. This will increase the power consumption and thus the overall production cost while shortening the life of the pneumatic pump 14. Moreover, the pneumatic pump 14 constantly emits running noises and may cause environmental disruption.

SUMMARY OF THE INVENTION

It is thus an object of the present invention to provide a sheet feeding apparatus capable of, if a feeding error of a front cover occurs, readily eliminating the cause of error without halting the main operation.

It is another object of the present invention to provide a sheet feeding apparatus which can improve the environmental conditions of a pneumatic pump. For achievement of the object of the present invention, a sheet feeding apparatus is provided comprising: a sheet reception inlet for receiving a set of first sheets; a tray for storing a stack of second sheets; a sheet set discharge outlet for releasing out a set of the sheets where the second sheet is placed over the first sheets; a first conveying path extending from the sheet reception inlet to the sheet set discharge outlet; a sheet conveying means for conveying the first sheets received at the sheet reception inlet in a sequence along the first conveying path to the sheet set discharge outlet; a second conveying path extending from the tray to the first conveying path and communicated at a junction with the first conveying path; a sheet feeding means for conveying the second sheet along the second conveying path to the junction with the first conveying path and placing the second sheet over the first sheets; a sheet transferring means for transferring each second sheet from the tray to the sheet feeding means; and a controlling means for controlling the action of the sheet conveying means, the sheet feeding means, and the sheet transferring means, wherein the sheet feeding means is changed to its standby mode when the second sheet is transferred from the sheet transferring means to the sheet feeding means and, when the first sheets cross the junction, the sheet feeding means starts the sheet feeding operation, thereby the second sheet is conveyed out from the second conveying path and placed over the first sheets.

Also, for achievement of the object of the present invention, a sheet feeding apparatus is provided comprising: a sheet reception inlet for receiving a set of first sheets; a tray for storing a stack of second sheets; a sheet stack-feed station for receiving the first sheets in a stack and placing the second sheet over the stack of the first sheets; a first conveying path extending from the sheet reception inlet to the sheet stack-feed station; a sheet conveying means for conveying the first sheets received at the sheet reception inlet in a sequence along the first conveying path to the sheet stack-feed station; a second conveying path extending from the tray to the first conveying path and communicated at a junction with the first conveying path; a sheet feeding means for conveying the second sheet along the second conveying path and feeding it to the first conveying path; a sheet transferring means for transferring each second sheet from the tray to the sheet feeding means; and a controlling means for controlling the action of the sheet conveying means, the sheet feeding means, and the sheet transferring means, wherein the sheet feeding means is changed to its standby mode when the second sheet is transferred from the sheet transferring means to the sheet feeding means and, upon the first sheets having been stacked in the sheet stack-feed station, starts sheet feeding operation, thereby the second sheet is conveyed out from the first conveying path and placed over the stack of the first sheets.

According to any of the above first and second arrangements, the second sheets are held at the standby mode but not conveyed continuously in synchronization with the conveying of the first sheets such as in the prior art. Accordingly in case that an error occurs during the conveying of the current second sheet, it is readily detected and the succeeding second sheet is held in the standby mode. This allows the error during the conveying of the second sheet to be eliminated without canceling the conveying of the first sheets, hence improving the operational efficiency of the system.

The second embodiment of the present invention may preferably be modified in which the sheet transferring means comprises: a pneumatic pump having an air outlet and an air inlet; a blow outlet provided in the tray and communicated by a first conduit to the air outlet of the pneumatic pump for lifting up each second sheet stored in the tray; a suction means communicated by a second conduit to the air inlet of the pneumatic pump and arranged to move between the first position for sucking the second sheet lifted up and the second position for transferring the second sheet to the sheet feeding means; a suction means actuating means for driving the suction means to move between the first position and the second position; and air valves provided between the air outlet of the pneumatic pump and the first conduit and between the air inlet of the pneumatic pump and the second conduit for controlling the air output and input of the pneumatic pump, wherein while the sheet feeding means is in its standby mode, the air valves are controlled by the controlling means to cancel the air output and input respectively of the pneumatic pump. Accordingly, the time of blowing a jet of air to lift up each second sheet is minimized. This allows the second sheet to be prevented from being injured and degraded in the quality and to be handled without difficulty in the succeeding step.

More preferably, it may be arranged in that while the sheet feeding means is in its standby mode, the air valves are turned off by the controlling means to cancel the air output or input respectively of the pneumatic pump. The pneumatic pump is operated for a minimum duration for transferring the second sheet and remains inactivated in the remaining duration. Accordingly, the operating period of the pneumatic pump can be reduced hence decreasing the power consumption and the running noise. Hence, the pneumatic pump will be extended in the operational life and improved in the environmental conditions. Also, as the pneumatic pump is operated intermittently, its temperature increase can be avoided by being cooled down in the inactivated duration. Accordingly, the second sheet will be prevented from being assaulted by a jet of hot air. As the second sheet is successfully prevented from its degradation, it can be handled without difficulty in the succeeding step.

As a preferred embodiment of the present invention, the sheet feeding apparatus may further comprise: sheet detection sensors provided at the entrance of the second conveying path; a discharge tray provided as branched out from an intermediate region of the second conveying path; and a switching gate provided at the branch point to the discharge tray of the second conveying path, wherein the action of the switching gate is controlled by the controlling means so that, in a normal mode, the second sheet is duly conveyed along the second conveying path and, when the sheet sensors detect that two or more of the second sheets are received by the sheet feeding means, the two or more second sheets are discharged to the discharge tray. Accordingly, in case that two or more second sheets are received by the sheet feed mechanism, they are automatically detected by the sheet detection sensors and thus discharged to the discharge tray. Undesired placement of two or more second sheets over a given set of the first sheets can favorably be avoided. Accordingly, in case that two or more second sheets are received by the sheet feed mechanism, they are automatically detected by the sheet detection sensors and thus discharged to the discharge tray. Undesired placement of two or more second sheets over a given set of the first sheets can favorably be avoided.

DETAILED DESCRIPTION OF THE PREFERRED EMBODIMENTS

Figure 1:
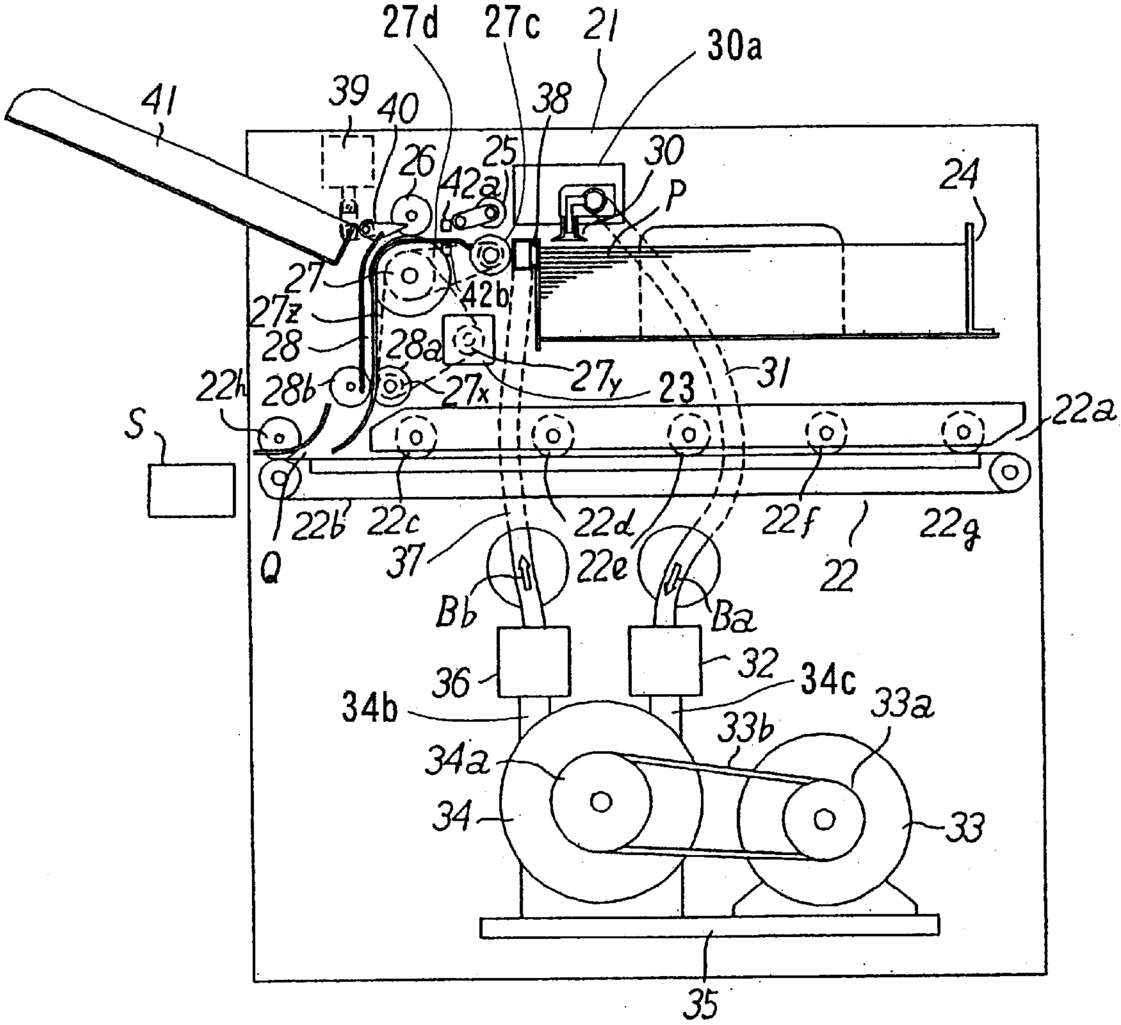
FIG. 1 is a side view of a sheet feeding apparatus according to one embodiment of the present invention.
Figure 2:
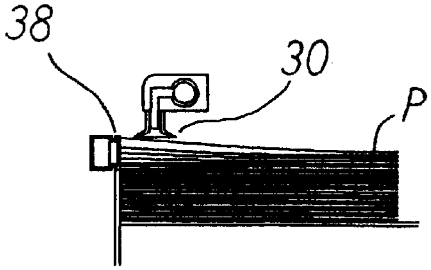
FIG. 2 is a side view explaining the action of an air outlet of the sheet feeding apparatus shown in FIG. 1.
Figure 3:
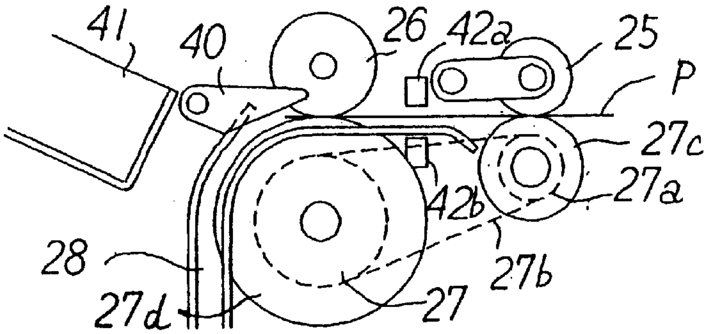
FIG. 3 is an enlarged side view of a sheet feeding mechanism shown in FIG. 1 in one mode of operation.
Figure 4:
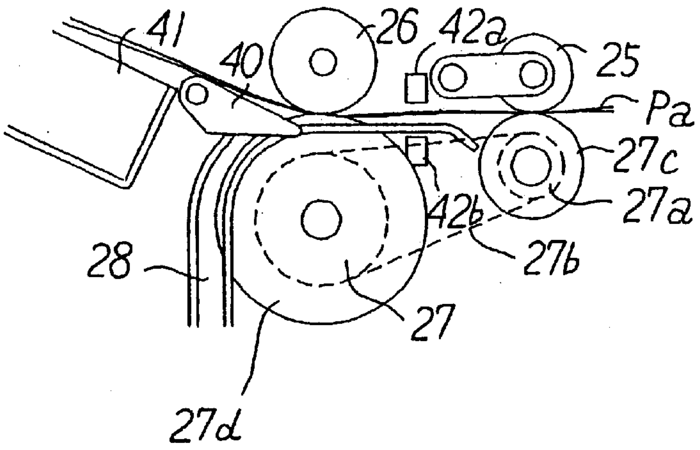
FIG. 4 is an enlarged side view of the sheet feeding mechanism shown in FIG. 1 in another mode of operation.

Preferred embodiments the present invention will be described in more detail referring to the accompanying drawings. FIG. 1 is a side view of a sheet feeding apparatus according to a first embodiment of the present invention. For ease of the description, a side panel of the apparatus is removed as shown in FIG. 1. FIG. 2 is a side view explaining the action of a blow outlet of the sheet feeding apparatus shown in FIG. 1. FIGS. 3 and 4 are enlarged side views illustrating an arrangement of a sheet feeding mechanism in the sheet feeding apparatus shown in FIG. 1.

In the sheet feeding apparatus of this embodiment, a set of sheets for a volume as the first sheets printed by a printing machine are received and then a front cover as the second sheet is fittingly placed over the sheets.

As shown in FIGS. 1 to 4, the sheet feeding apparatus 21 according to the present invention comprises a sheet reception inlet 22*a* for receiving the sheets from the printing machine (not shown), a tray 24 for storage of a stack of the front covers P, and a sheet stack-feed station S for stacking up the sheets and placing the front cover P on a stack of the sheets.

The sheet feeding apparatus 21 also includes a first conveying path 22 extending from the sheet reception inlet 22*a* to the sheet stack-feed station S and a sheet conveying mechanism for conveying the sheets received at the sheet reception inlet 22*a* to the sheet stack-feed station S along the first conveying path 22. The sheet conveying mechanism comprises a conveyor belt 22*b*, transfer rollers 22*c* to 22*g* cooperated with the conveyor belt 22*b*, and a discharge roller 22*h*.

The sheet feeding apparatus 21 further includes further includes a second conveying path 28 extending from the tray 24 to the first conveying path 22 for joining with the first conveying path 22 and a sheet feeding mechanism for feeding a front cover P conveyed along the second conveying path 28 to the first conveying path 22.

The sheet feeding mechanism comprises a pair of pressure rollers 25 and 27*c*, a pair of transfer rollers 26 and 27*d*, and a pair of feed rollers 28*a* and 28*b*. The transfer roller 27*d* is joined at its rotary shaft to an electromagnetic clutch 27 while the feed roller 28*b* is joined to a sprocket 27*x*. The electromagnetic clutch 27 and the sprocket 27*x* are connected by an endless chain 27*z* to a sprocket 27*y* mounted on the drive shaft of a motor 23. A pulley 27*a* is mounted to the rotary shaft of the pressure roller 27*c* and connected via an endless chain 27*b* to the electromagnetic clutch 27.

The sheet feeding apparatus 21 further includes a sheet transfer mechanism for transferring the front covers P one by one from the tray 24 to the sheet feeding mechanism, a sheet conveying mechanism, a sheet feeding mechanism, and a controller device 45 for controlling the sheet transfer mechanism.

The controller device 45 consisting mainly of a central processor unit (CPU), memories (ROM and RAM), and an interface.

The sheet transfer mechanism includes a pneumatic pump 34 having an air inlet 34*b* and an air outlet 34*c* and a drive motor 33 for driving the pneumatic pump 34. A first pulley 33*a* is mounted to the output shaft of the drive motor 33 while a second pulley 34*a* is mounted to the rotary shaft of the pneumatic pump 34. An endless belt 33*b* is mounted between the first pulley 33*a* and the second pulley 34*a* for transmitting the power of the drive motor 33 to the pneumatic pump 34.

The sheet transfer mechanism also includes a blow outlet 38 provided in the tray 24 and communicated by a first conduit 37 to the air outlet 34*b* of the pneumatic pump 34 for blowing to lift up a front cover P in the tray 24, a sucker 30 communicated by a second conduit 31 to the air inlet 34*c* of the pneumatic pump 34 and arranged for movement between the first position for sucking the front cover P lifted up and the second position for transferring the front cover P to the sheet feeding mechanism, a sucker driving mechanism 30*a* for moving the sucker 30 between the first position and the second position, and a couple of air valves 32 and 36 mounted between the air inlet 34*c* of the pneumatic pump 34 and the second conduit 31 and between the air outlet 34*c* and the first conduit 37 respectively for controlling the air intake and the air discharge of the pneumatic pump 34.

The sheet feeding mechanism is operated for receiving the front cover P from the sheet transfer mechanism while the set of sheets are conveyed one by one by the sheet conveying mechanism, shifting its action to the standby mode when the reception is completed, and when the sheets have been stacked up at the sheet stack-feed station S, forwarding from the first conveying path 22 and placing the front cover P on the stack of the sheets. With the sheet feeding mechanism staying in the standby mode, the controller device 45 controls the air valves 32 and 36 or stops the action of the pneumatic pump 34 for canceling the air intake and the air discharge of the pneumatic pump 34.

The sheet feeding mechanism further includes a couple of sheet sensors 42*a* and 42*b* located at the inlet of the second conveying path 28, a discharge tray 41 provided at a branch of the second conveying path 28, and a switching gate 40 disposed at a junction between the second conveying path 28 and its branch for switching the transfer of the front cover P between the second conveying path 28 and the discharge tray 41.

The two sheet sensors 42*a* and 42*b* may be optical sensors or the like and in this embodiment, are located between the pressure roller 25 and the transfer roller 26 and between the pressure roller 27*c* and the transfer roller 27*d* respectively and distanced from each other on both, upper and lower, sides of the conveying path.

The action of the switching gate 40 is controlled by the controller device 45 so as to direct the front cover P to be conveyed along the second conveying path 28 in the normal mode and, when the sheet sensors 42*a* and 42*b* detect that two or more of the front covers P are transferred to the sheet feeding mechanism, direct the excessive front covers P to be passed to the discharge tray 41.

Figure 12:
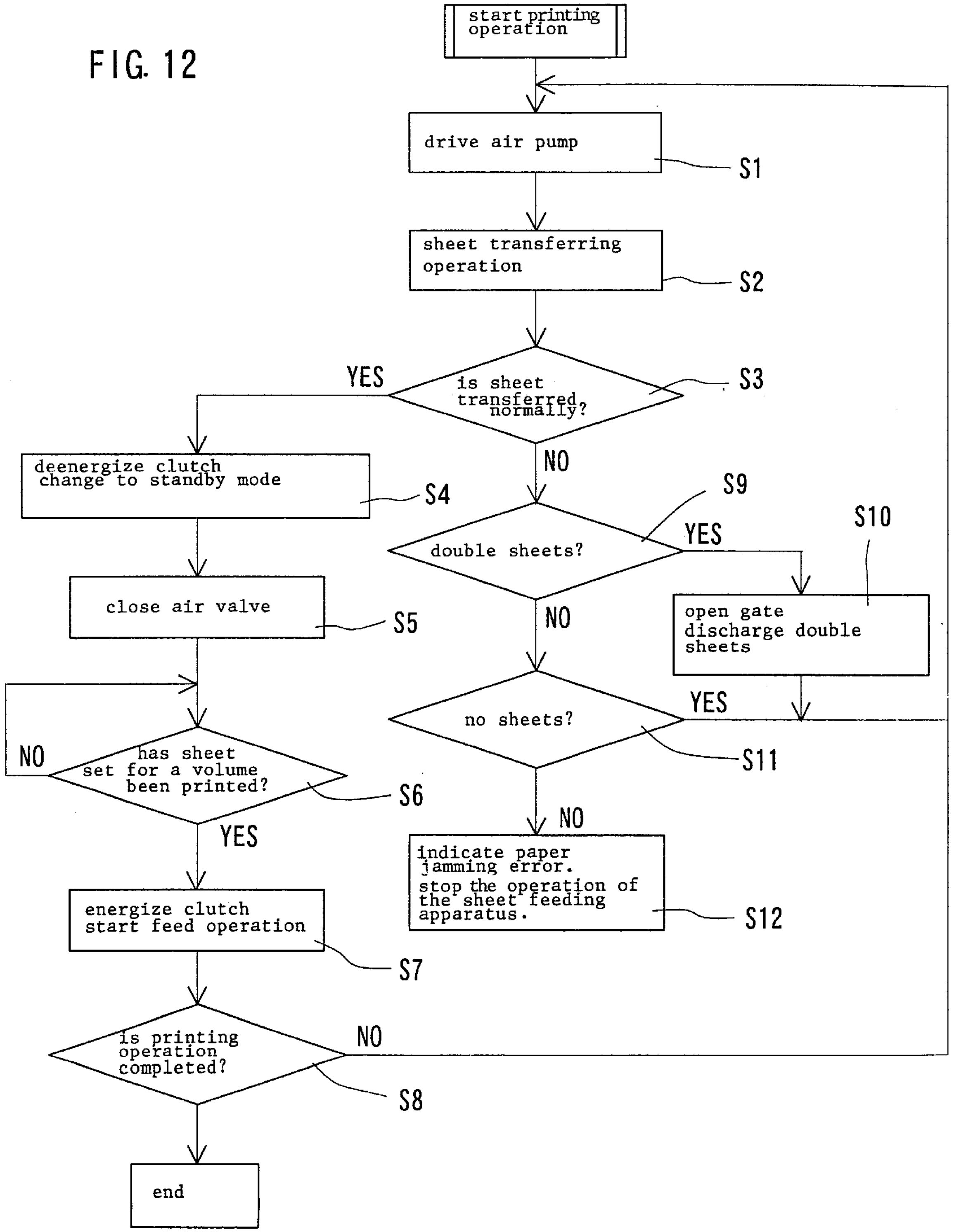
FIG. 12 is a flow chart showing the control of the sheet feeding mechanism by a controller device.
Figure 13:
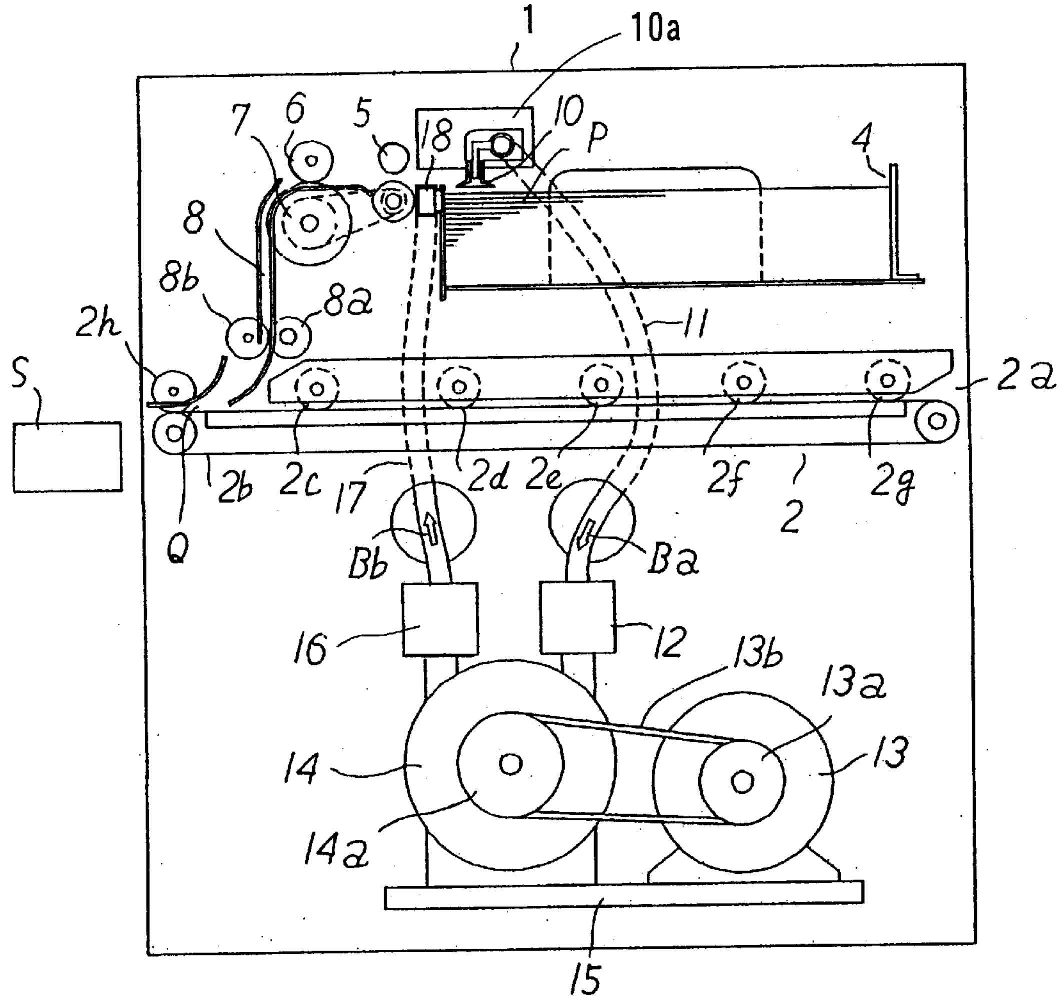
FIG. 13 (Prior Art)
FIG. 13 is a side view of a conventional sheet feeding apparatus.

FIG. 12 is a flow chart showing the control of the sheet feeding mechanism by the controller device. Referring to FIG. 12, when the printing machine starts printing operation, the pneumatic pump 34 starts to drive and the air valve 36 is opened, so that a blow of air is released out from the blow outlet 38 towards an upper portion of the stack of the front covers in the tray 24, as shown in FIG. 2, thus to lift up the uppermost front cover P (FIG. 12, Step S1). Then the sucker 30 at its first position sucks up the uppermost front cover P lifted up and then moves with it to the second position. At the second position, the front cover P sucked by the sucker 30 is located with its leading edge between the two pressure rollers 25 and 27*c*.

The pressure roller 25 at its initial position is separated from the opposite pressure roller 27*c* as shown in FIG. 1. The pressure roller 27*c* is rotated by the action of the chain 27*b* and the pulley 27*a* with the clutch 27 engaged. When the leading edge of the front cover P comes to between the two pressure rollers 25 and 27*c*, the pressure roller 25 advances from the initial position shown in FIG. 1 to the operating position shown in FIG. 3 and thus presses the front cover P against the opposite pressure roller 27*c*. Then, the air valve 32 is shut off to stop the sucking action of the sucker 30. Accordingly, the front cover P is transferred to the sheet feeding mechanism by the action of the sheet transfer mechanism (FIG. 12, Step S2).

The front cover P is then conveyed by the action of the two transfer rollers 26 and 27*d* of the sheet feeding mechanism as sandwiched between the two pressure rollers 25 and 27*c*. The forward movement of the front cover P is detected by the sheet sensors 42*a* and 42*b* which in turn release a detection signal. The controller device 45 receives the detection signal from the sheet sensors 42*a*, 42*b* and determines whether a sheet transfer error arises or not (FIG. 12, Step S3).

When the second sheet is normally transferred from the sheet transfer mechanism to the sheet feeding mechanism, the controller device 45 deenergizes the electromagnetic clutch 27 to stop the rotation of the pressure rollers 25 and 27*c* and the transfer rollers 26 and 27*d*. The sheet feeding mechanism is then changed to the standby mode (FIG. 12, Step S4). Simultaneously, the controller device 45 operates the air valve 36 to close so as to cancel the blow of air from the blow outlet 38 (FIG. 12, Step S5).

When the sheet set for one volume of book has been printed, the electromagnetic clutch 27 is re-energized to release the sheet feeding apparatus from its standby mode. When the pressure rollers 25 and 27*c* and the transfer rollers 26 and 27*d* rotate, the front cover P is conveyed along the second conveying path 28 and transferred to the first conveying path 22 (FIG. 12, Steps S6 and S7). Simultaneously, the air valve 36 is opened thus to lift up the uppermost of the front covers P in the stack in the tray 24. When the sheet sensors 42*a* and 42*b* detect the passing of the trailing edge of the uppermost front cover P conveyed along the second conveying path 28, they open the air valve 32 and allows the sucker 30 at its first position to suck up the succeeding front cover P in the stack and passed to the sheet feeding mechanism (FIG. 12, Step S8).

FIG. 4 is a side view showing two front covers Pa received at one time by the sheet feeding mechanism. In this case, overlap of the two front covers Pa is detected by the sheet sensors 42*a* and 42*b* and its detection signal is transmitted to the controller device 45 (FIG. 12, Step S9). In response, the controller device 45 drives the switching gate 40 to direct the two front covers Pa to the discharge tray 41. When the two front covers Pa have been received by the discharge tray 41, the succeeding front cover P is transferred from the sheet transfer mechanism to the sheet feeding mechanism (FIG. 12, Step S10). As described, if two or more of the front covers are received at once by the sheet feeding mechanism, they are automatically diverted to the discharge tray 41, hence preventing two or more front covers from being conveyed and placed over the set of sheets.

In case that the sucker 30 fails to suck up and transfer the front cover P to the sheet feeding mechanism, its fault action is detected by the sheet sensors 42*a* and 42*b* (FIG. 12, Step S11). Then, the action of the sucker 30 is repeated to successfully transfer the front cover P from the sheet transfer mechanism to the sheet feeding mechanism. When paper jamming is detected by the sheet sensors 42*a*, 42*b*, the controller device 45 indicates the paper jamming error and stops the operation of the sheet feeding apparatus (FIG. 12, Step 12).

In this embodiment, both the air valve 36 for functioning the blow outlet 38 and the air valve 32 for activating the sucker 30 remain shut off in the standby mode and are opened for picking the succeeding front cover, whereby the air blowing action and the sucking action can be controlled. The controlling by opening and closing the air valves 32 and 36 may preferably be used when the cycle of front cover transfer action is short, i.e. the cycle of printing the sheets on the printing machine is short. Because the duration of releasing the blow of air for lifting up some front covers is reduced to the least required length, the front covers can be prevented from being deformed and declined in the quality, hence allowing smooth handling at the next processing stage.

If the cycle of transferring the front cover is long, the air blowing action and the sucking action can be controlled by turning on and off the pneumatic pump 34. As the pneumatic pump 34 is actuated for a minimum period required for the transfer of the front cover and remains inactivated throughout in the remaining duration. Accordingly, the driving time of the pneumatic pump 34 is shortened thus decreasing the power consumption and the operating noises, increasing the life of the pneumatic pump 34, and improving the working environment about the pneumatic pump 34.

In this embodiment, a set of sheets received from the printing machine are conveyed to the sheet stack-feed station S where a front cover is placed over a stack of the sheets, as illustrated. If the sheets are received from a sorter and conveyed along the first conveying path 22, the front cover is fed and placed over the sheets at the junction Q between the first conveying path 22 and the second conveying path 28.

Figure 5:
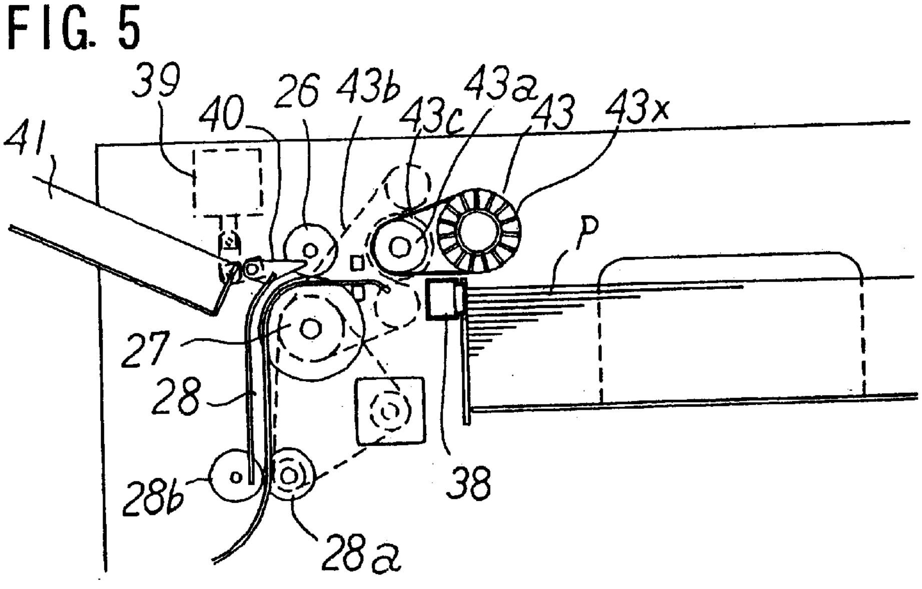
FIG. 5 is a partial side view of a sheet feeding mechanism according to another embodiment of the present invention.

FIG. 5 is a partial side view of an arrangement of a sheet feeding apparatus showing another embodiment of the present invention. In the embodiment of FIG. 5, the mechanism for transferring a front cover to the sheet feeding mechanism is a vacuum rotor 43. The vacuum rotor 43 has a vacuum chamber therein and a multiplicity of apertures 43*x* provided in an outer rotor shell thereof to communicate with the vacuum chamber. The power is transmitted from an electromagnetic clutch 27 via a power transmission mechanism 43*b*, which consists mainly of rollers and a chain, to a drive roller 43*b* which is then rotated. The rotation of the drive roller 43*b* is transmitted via a chain 43*c* to the vacuum rotor 43. As the vacuum rotor 43 rotates, the front cover P is sucked and transferred to the sheet feeding mechanism.

Figure 6:
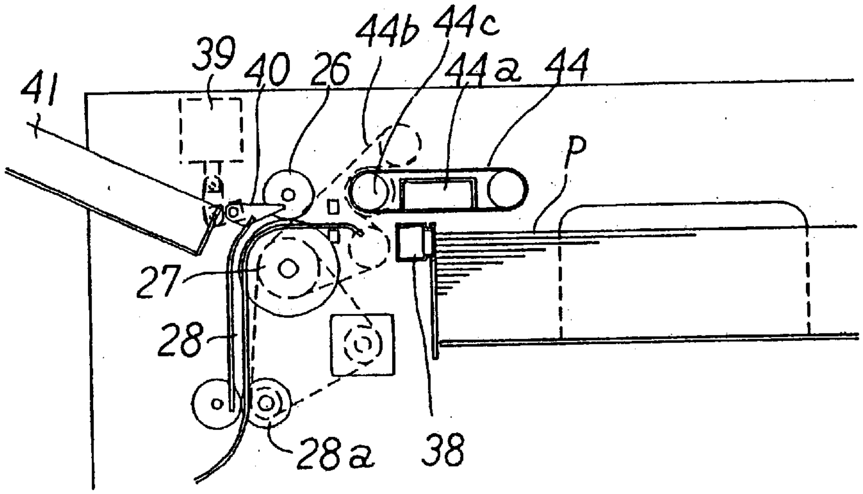
FIG. 6 is a partial side view of a sheet feeding mechanism according to yet a further embodiment of the present invention.
Figure 7:
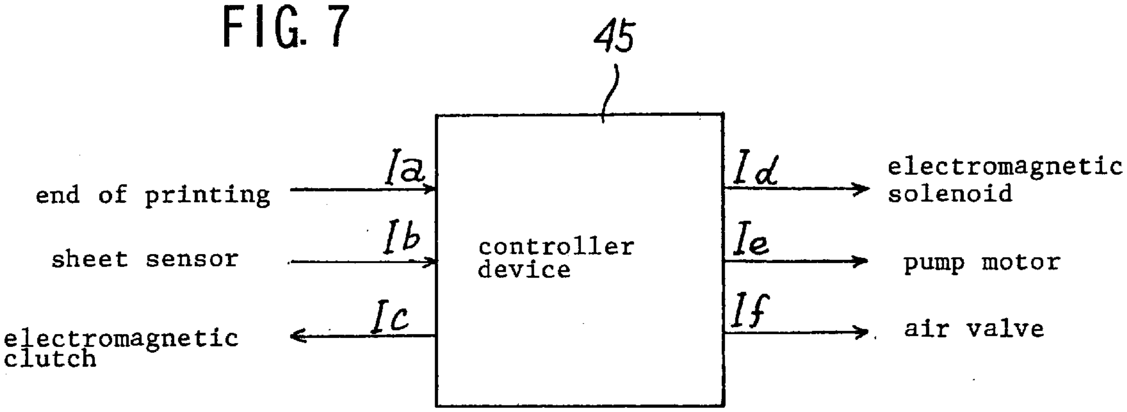
FIG. 7 is a block diagram of a controller device.

FIG. 6 is a partial side view of an arrangement of a sheet feeding apparatus showing a further embodiment of the present invention. In the embodiment of FIG. 6, the transfer mechanism is a suction belt 44. The suction belt 44 has a vacuum chamber 44*a* therein and a multiplicity of air suction apertures provided in a belt thereof, hence allowing the front cover to be sucked up to the belt surface. Denoted by 44*b* is a power transmission mechanism which consists mainly of rollers and a chain. The power transmission mechanism 44*b* transmits the power from an electromagnetic clutch 27 to a rotary roller 44*c* of the suction belt 44.

The controller device 45 receives a printing end signal Ia indicative of the end of printing a set of sheets for one volume of book as well as signals Ib from the sheet sensors 42*a* and 42*b*. In turn, it releases a control signal Ic for the electromagnetic clutch 27, a control signal Id for an electromagnetic solenoid 39, a control signal Ie for a drive motor 33 connected to the pneumatic pump 34, and a control signal If for the air valves 32 and 36.

The printing end signal Ia is released from the printing machine and adapted for determining the timing of feeding the front cover held in the standby mode to a stack of sheets in the sheet stack-feed station S. This signal may be replaced by a sorting end signal when a stack of the sheets is sorted by a sorter before received. The control signal Ic for controlling the electromagnetic clutch 27 is an on/off signal for engagement between the electromagnetic clutch 27 and the drive motor and, if desired, may be an on/off signal for controlling directly the drive motor.

Figure 8:
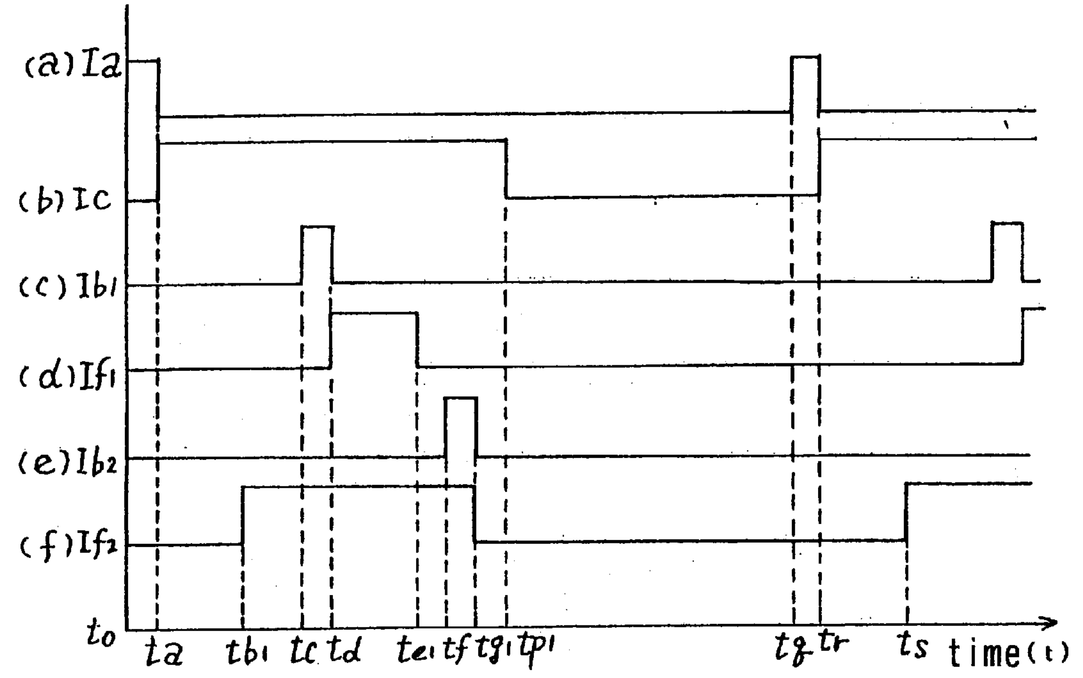
FIG. 8 is a timing chart showing an action of the components.

FIGS. 8 to 11 are timing charts showing actions of the components controlled by the controller device 45. FIG. 8 illustrates an action of the sheet feeding mechanism receiving a front cover normally, FIG. 9 an action of the sheet feeding mechanism receiving no front cover, FIG. 10 an action of the sheet feeding mechanism receiving two or more front covers, and FIG. 11 an action of the sheet feeding mechanism having received a front cover correctly and allowing the pneumatic pump to stop.

Figure 9:
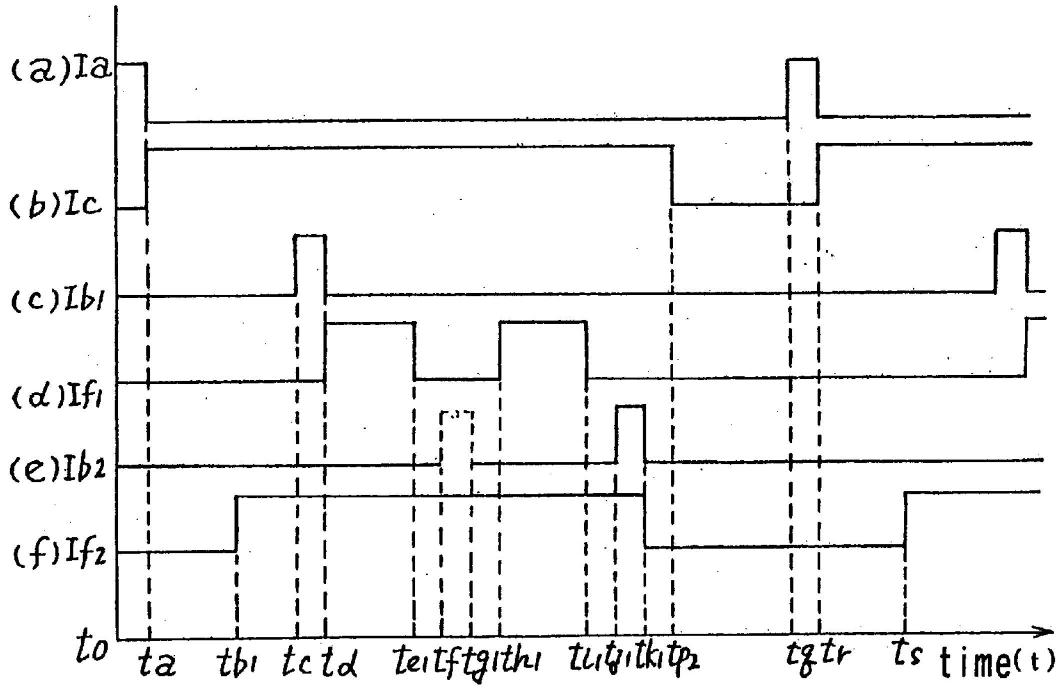
FIG. 9 is a timing chart showing an action of the components.
Figure 10:
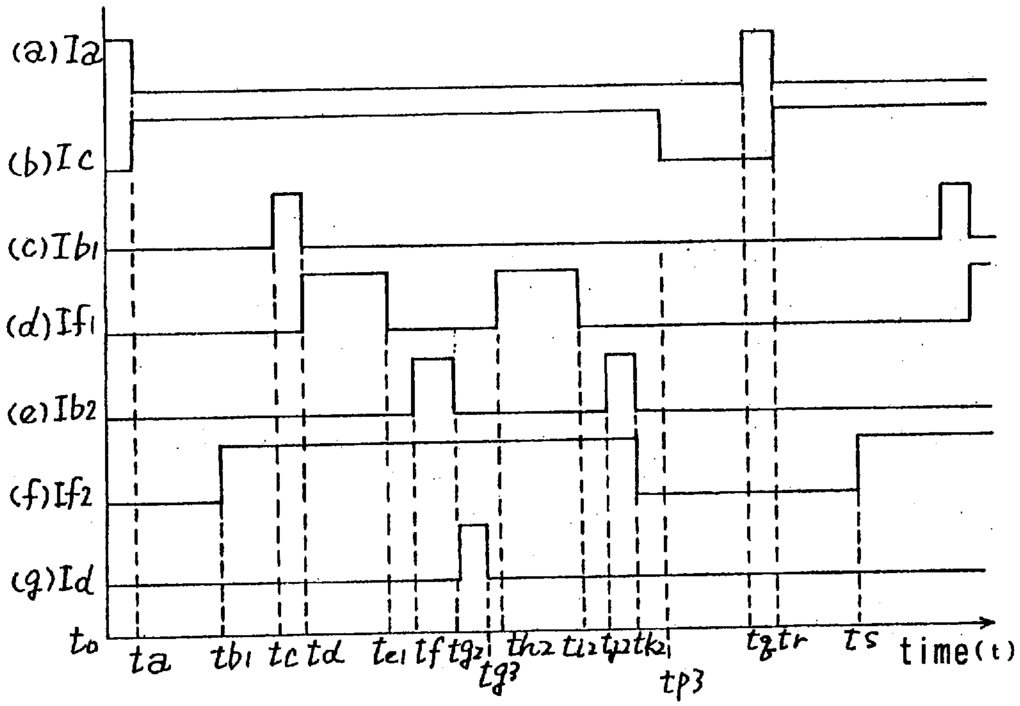
FIG. 10 is a timing chart showing an action of the components.
Figure 11:
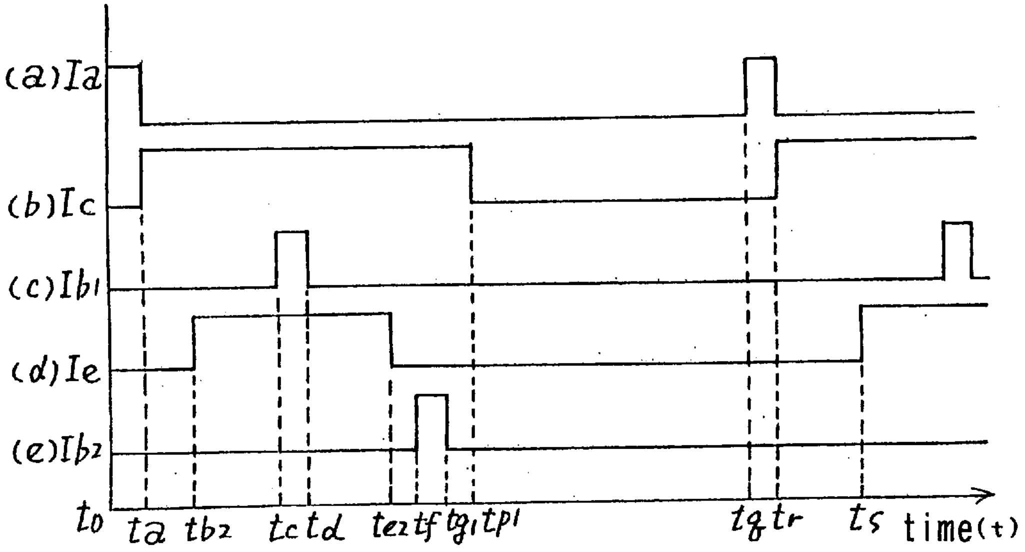
FIG. 11 is a timing chart showing an action of the components.

Illustrated in FIGS. 8 to 10 are the timing (a) of the printing end signal Ia (a), the timing (b) of the control signal Ic for the electromagnetic clutch 27, the timing (c) of the detection signal Id1 of the sheet sensor indicative of detecting the trailing end of a front cover, the timing (d) of the control signal If2 for the air valve 32, the timing (e) of the detection signal Ib2 of the sheet sensor indicative of detecting the leading end of a front cover, the timing (f) of the control signal If2 for the air valve 36, and the timing (g) of the control signal Id for the electromagnetic solenoid. FIG. 11 illustrates the timing (d) of the control signal Ie for the drive motor of the pneumatic pump together with the timings (a) to (c) and (e) equal to those described above.

As shown in FIG. 8, at the time ta when the printing end signal Ia introduced at t0 falls, the control signal Ic for the electromagnetic clutch 27 rises to release out from the second conveying path 28 the current front cover held in the standby mode between the two pressure rollers 25 and 27*c*. At the time tb1, the control signal If2 for the air valve 36 rises to open the air valve 36 allowing a jet of air to blow against and lift up the succeeding front cover.

When the standby mode has been canceled, the trailing end of the current front cover conveyed along the second conveying path 28 is detected at the time tc by the sheet sensor. Then, at the time td when the detection signal falls, the control signal If1 for the air valve 32 rises actuating the sucker 30 for sucking the succeeding front cover P lifted up. The front cover P sucked by the sucker 30 is conveyed to between the two pressure rollers 25 and 27*c*. This is followed by the control signal If1 for the air valve 32 rinsing at the time te1.

At the time tf, the leading end of the front cover conveyed from between the two pressure rollers 25 and 27*c* to between the transfer rollers 26 and 27*d* is detected by the sheet sensors 42*a* and 42*b*. At the time tg1 when the detection signal falls, the air valve 36 is shut off. When a duration from tg1 to tp1 is elapsed, the electromagnetic clutch 27 is disengaged from the output shaft of the drive motor causing the leading end of the front cover to be nipped between the two transfer rollers 26 and 27*d*. Simultaneously, the trailing end of the front cover is held between the two pressure rollers 25 and 27*c* so that the front cover is in the standby mode before the second conveying path 28.

At the time tq, the printing end signal Ia is received. At the timing tr of its fall, the control signal Ic for the electromagnetic clutch 27 rises to release out from the second transfer path 28 the succeeding front cover held in the standby mode between the two pressure rollers 25 and 27*c*. At the time ts, the control signal If2 for the air valve 36 rises to open the air valve 36 hence allowing a jet of air to blow against the next front cover to be picked up. Then, the procedure described above is repeated.

FIG. 9 is a timing chart showing the sheet feeding mechanism receiving no front cover. The actions from the time t0 to the time te1 are identical to those shown in FIG. 8 and will be described in no more detail. At the time tf, any front cover to be picked up is not detected by the sheet sensors. Accordingly, no rise of the detection signal appears at the time tg1.

In this case, after tg1, the air valve 36 remains not closed, unlike shown in FIG. 8, allowing a jet of air to blow continuously. This is followed by the air valve 32 being opened again at the time th1, allowing the sucker 30 to suck the uppermost front cover and transfer to the sheet feeding mechanism. At the time ti1, the air valve 32 is shut off and at the time tj1, the leading end of the front cover is detected by the sheet sensors. Then, the detection signal falls at the time tk1 to close the air valve 36.

Then, the time goes from tk1 to tp2 and the electromagnetic clutch 27 is disengaged from the output shaft of the drive motor. As a result, the front cover is held at its leading end between the two transfer rollers 26 and 27*d* and at its trailing end between the two pressure rollers 25 and 27*c*, thus coming into the standby mode before the first conveying path 22.

FIG. 10 is a timing chart of the sheet feeding mechanism receiving two or more front covers. The actions from the time t0 to the time te1 are identical to those shown in FIG. 8 and will be explained in no more detail. At the time tf, the sheet feeding mechanism receiving two or more front covers is detected by the sheet sensors and at the time tg2, the detection signal falls.

In response, the electromagnetic solenoid 39 is actuated at the time tg2 for driving the switching gate 40 to switch the transfer of the front covers P from the second conveying path 28 to the discharge tray 41. If two or more of the front covers P are received by the sheet feeding mechanism, they are deviated to the discharge tray 41 and then, the transfer of one front cover to the sheet feeding mechanism is repeated.

More specifically, the air valve 36 remains not closed after the time tg2 allowing a jet of air to blow out continuously. When the trailing end of the front cover received by the sheet feeding mechanism is detected by the sheet sensors, as not shown, the air valve 32 is opened again at the time th2 by the same manner as shown in FIG. 9, causing the sucker 30 to suck up and transfer the succeeding front cover to the sheet feeding mechanism. This is followed by the air valve 32 being shut off at the time ti2 and the sensors detecting the leading end of the succeeding front cover at the time tj2. At the time tk2 when the detection signal falls, the air valve 36 is shut off.

Then, the time goes from tk2 to tp3 and the electromagnetic clutch 27 is disengaged from the output shaft of the drive motor. As a result, the front cover is held at its leading end between the two transfer rollers 26 and 27*d* and at its trailing end between the two pressure rollers 25 and 27*c*, thus coming into the standby mode.

FIG. 11 is a timing chart of the pneumatic pump 34 turned on and off in place of the air valves 32 and 36 shifted between the close action and the open action by controlled timing. The turning on and off of the pneumatic pump 34 may be applied in case that the interval between the two printing end signals Ia is relatively long. When the interval between the two printing end signals Ia is short, a time lag produced in the turning on and off of the pneumatic pump 34 may extend out from the interval hence causing an operational fault. The interval between the two printing end signals Ia is preliminarily recorded in the controller device. As compared with the procedure shown in FIG. 8, the time tb2 of starting the pump motor is earlier than the time tb1 of opening the air valve 36 and the time te2 of stopping the pump motor is later than the time te1 of closing the air valve 32.

The time of starting the drive motor 33 for the pneumatic pump 34 is set earlier because a duration of time is needed from the start of the drive motor 33 to the output of air from the air valve 36. The time of stopping the drive motor 33 is lagged behind the time of closing the air valve 32 because the suction of the front cover by the sucker and the blow of air towards the front cover to be picked up are triggered by the action of the drive motor 33.

FIG. 11 illustrates an action where the drive motor 22 for the pneumatic pump 34 is turned on during the minimum period required for transfer of the front cover P and off during the other period. Accordingly, the operating time of the pneumatic pump 34 can be decreased thus minimizing the power consumption. Also, the pneumatic pump 34 can successfully be reduced in the running noise and increased in the operational life, hence improving its environmental conditions.

Also, the time for blowing a jet of air against the front cover P is minimized hence preventing the front cover P from being injured and degraded in the quality. As the pneumatic pump 34 is intermittently operated, it can be cooled down during its non-operating period thus hardly increasing the temperature. Accordingly, the front cover P will rarely be assaulted by a jet of hot air and its degradation in the quality will further be avoided.

This embodiment is based on the front covers P stored in a stack in the tray 24 and each transferred from the second conveying path 28 to the first conveying path 22 and then placed over a bunch of sheets. The present invention is not limited to the embodiment but may successfully be applied to any other application such as interleaving second sheets between first sheets or color coated sheets between the monochromatically printed sheets.

Although the discharge outlet of the sheet feeding apparatus is connected to the sheet stack-feed station S in the embodiment, it may be communicated with a book manufacturing machine such as a book binder. When the sheet feeding apparatus 21 of the present invention is joined to a book binding line, the second sheets even if having some defectives can continuously be handled without halting the book binding line.

What is claimed is:

1. A sheet feeding apparatus comprising:

a sheet reception inlet for receiving a set of first sheets;

a tray for storing a stack of second sheets;

a sheet set discharge outlet for releasing out a set of the sheets where the second sheet is placed over the first sheets;

a first conveying path extending from the sheet reception inlet to the sheet set discharge outlet;

a sheet conveying means for conveying the first sheets received at the sheet reception inlet in a sequence along the first conveying path to the sheet set discharge outlet;

a second conveying path extending from the tray to the first conveying path and communicated at a junction with the first conveying path;

a sheet feeding means for conveying the second sheet along the second conveying path to the junction with the first conveying path and placing the second sheet over the first sheets;

a sheet transferring means for transferring each second sheet from the tray to the sheet feeding means; and a controlling means for controlling the action of the sheet conveying means, the sheet feeding means, and the sheet transferring means, wherein the sheet feeding means is changed to a standby mode when the second sheet is transferred from the sheet transferring means to the sheet feeding means and, when the first sheets cross the junction, the sheet feeding means starts sheet feeding operation, thereby the second sheet is conveyed out from the second conveying path and placed over the first sheets.

2. The sheet feeding apparatus according to claim 1 wherein the sheet transferring means includes a sucker arranged to lift the second sheet from the tray and transfer the second sheet to the sheet feeding means.

3. The sheet feeding apparatus according to claim 1, wherein the sheet transferring means includes a vacuum rotor arranged to lift the second sheet from the tray and transfer the second sheet to the sheet feeding means.

4. The sheet feeding apparatus according to claim 1, wherein the sheet transferring means includes a suction belt arranged to lift the second sheet from the tray and transfer the second sheet to the sheet feeding means.

5. The sheet feeding apparatus according to claim 1, including at least one sheet sensor located at an inlet of the second conveying path, a discharge tray provided at a branch of the second conveying path, and a switching gate disposed between the second conveying path and the branch, arranged to switch the transfer of a second sheet between the second conveying path and the discharge tray.

6. The sheet feeding apparatus according to claim 5, wherein the sheet transferring means includes a first pressure roller, a first transfer roller, a second pressure roller and a second transfer roller and two sheet sensors are provided, one between the first pressure roller and first transfer roller and the other between the second pressure roller and the second transfer roller, so as to detect when two or more second sheets are transferred to the sheet feeding mechanism and direct excessive second sheets to the discharge tray.

7. The sheet feeding apparatus according to claim 5, wherein the at least one sheet sensor is an optical sensor.

8. The sheet feeding apparatus according to 1, further comprising:

sheet detection sensors provided at the entrance of the second conveying path;

a discharge tray provided as branched out from an intermediate region of the second conveying path; and a switching gate provided at the branch point to the discharge tray of the second conveying path, wherein the action of the switching gate is controlled by the controlling means so that, in a normal mode, the second sheet is duly conveyed along the second conveying path and, when the sheet sensors detect that two or more of the second sheets are received by the sheet feeding means, the two or more second sheets are discharged to the discharge tray.

* * * * *